United States Patent
Peng et al.

(10) Patent No.: US 11,596,147 B2
(45) Date of Patent: Mar. 7, 2023

(54) AFTERLOAD DEVICE FOR EX SITU HEART PERFUSION

(71) Applicant: SHANGHAI UNIVERSITY, Shanghai (CN)

(72) Inventors: Yan Peng, Shanghai (CN); Zhibing Xu, Shanghai (CN); Liming Xin, Shanghai (CN); Jun Luo, Shanghai (CN); Shaorong Xie, Shanghai (CN); Huayan Pu, Shanghai (CN); Shouwei Gao, Shanghai (CN); Mitesh Badiwala, Shanghai (CN); Yu Sun, Shanghai (CN)

(73) Assignee: Shanghai University, Shanghai (CN)

( * ) Notice: Subject to any disclaimer, the term of this patent is extended or adjusted under 35 U.S.C. 154(b) by 401 days.

(21) Appl. No.: 16/910,930

(22) Filed: Jun. 24, 2020

(65) Prior Publication Data
US 2021/0037811 A1  Feb. 11, 2021

(30) Foreign Application Priority Data
Aug. 7, 2019  (CN) .......................... 201910724686.1

(51) Int. Cl.
*A01N 1/02* (2006.01)
(52) U.S. Cl.
CPC ......... *A01N 1/0247* (2013.01); *A01N 1/0273* (2013.01)
(58) Field of Classification Search
CPC .................... A01N 1/0247; A01N 1/0273
See application file for complete search history.

(56) References Cited

U.S. PATENT DOCUMENTS

| 10,391,030 B2* | 8/2019 | Gentile ..................... A61J 1/10 |
| 10,405,756 B2* | 9/2019 | Steen ................. A61B 5/02233 |
| 2015/0342177 A1* | 12/2015 | Hassanein ............. C12M 29/10 435/284.1 |

FOREIGN PATENT DOCUMENTS

| CN | 101886032 A | 11/2010 |
| CN | 103442675 A | 12/2013 |
| CN | 105228944 A | 1/2016 |
| CN | 106028807 A | 10/2016 |
| WO | 2011037511 | 3/2011 |

OTHER PUBLICATIONS

Office Action for Chinese Patent Application No. 201910724686.1, dated Feb. 27, 2020.

* cited by examiner

*Primary Examiner* — Omeed Alizada
(74) *Attorney, Agent, or Firm* — Andrus Intellectual Property Law, LLP

(57) ABSTRACT

The present invention discloses an afterload device for ex situ heart perfusion, which includes an afterload energy storage module, a pressure regulation module and two flow rate regulators that are connected through a conduit. The afterload energy storage module includes a rigid closed container and a flexible container. The perfusion fluid flows into the flexible container from one side thereof through the conduit, and the perfusion fluid flows out from the flexible container at another side thereof as the flexible container is subjected to the action of the medium pressure in the rigid hermetic container. The pressure regulation module includes two pressure regulation valves and a compressible-medium source, for regulating the pressure range within the rigid hermetic container to be always maintained between the set diastolic pressure and the set systolic pressure.

6 Claims, 2 Drawing Sheets

AFTERLOAD DEVICE FOR EX SITU HEART PERFUSION

TECHNICAL FIELD

The present invention relates to the field of biomedical engineering technology, and in particular to an afterload device for ex situ heart perfusion.

BACKGROUND

Ex situ heart perfusion (ESHP) is an effective means of promoting preservation and functional evaluation of a donor heart. Using this technique, not only can a dysfunctional donor heart be evaluated ex vivo, but also a heart of poor quality can be repaired ex vivo to change its performance, thereby expanding a donor pool.

The ex situ heart perfusion was first proposed by Oscar Langendorff in the late 19th century. In a traditional perfusion of Langendorff mode, a perfusion fluid is reversely perfused through a cardiac aortic cannula. Due to the action of a hydraulic pressure of perfusion, an aortic valve is closed and the perfusion fluid flows into a coronary artery to supply oxygen and energy to the heart, thereby enabling a heart to keep beating for hours.

This is an effective perfusion manner, but since the reverse perfusion is non-physiological, the measured cardiac function parameters and the pressure waveform of the aorta are quite different from those within the actual body, which affects the quality of perfusion and is not suitable for the application in a heart function research. Thus a perfusion manner in a working mode emerges, where the perfusion fluid is positively perfused into the heart, to simulate the environment in which the heart flows correctly in the body.

The heart is a power source that drives blood circulation, which pumps fresh blood sent by a pulmonary vein into an arterial system by means of the contraction of a ventriculus sinister. The heart must squeeze the blood into an artery to the maximum extent, and must overcome the resistance of the arterial system, also called as an afterload. In an ex situ perfusion system, a blood vessel is replaced by a medical tube, and when pumped out, the blood flows back to the heart without encountering any resistance. This is significantly different from the actual physiological condition in the body. The afterload degree directly affects the function of the heart and affects the quality of the perfusion.

Thus it can be seen that, it is an urgent problem to be solved to provide an afterload device for ex situ heart perfusion.

SUMMARY

An objective of the present invention is to provide an afterload device for ex situ heart perfusion, to address the aforementioned problems existed in the prior art, which can provide a resistance from which the blood suffers when pumped out, and simulate a normal working mode of the heart in the body.

In order to achieve the above objective, the present invention provides the following solution: the present invention provides an afterload device for ex situ heart perfusion, which includes an energy storage module, a pressure regulation module and two flow rate regulators, where the energy storage module includes a flexible container and a rigid hermetic container filled with compressible media, the flexible container is placed in the inner cavity of the rigid hermetic container and connected to the two flow rate regulators via a conduit; and the pressure regulation module includes two pressure regulation valves and a compressible-medium source, where the two pressure regulation valves are in communication with the rigid hermetic container, and the one with a lower preset pressure value in the two pressure regulation valves is connected to the compressible-medium source.

Furthermore, the flexible container includes at least has two interfaces, and the two interfaces are respectively sealingly connected to two openings on the rigid hermetic container through a conduit.

Furthermore, the two flow rate regulators located outside the rigid hermetic container are respectively installed on an inlet conduit and an outflow conduit, and the inlet conduit and the outflow conduit are connected to the two interfaces of the flexible container through a joint I and a joint II, respectively.

Furthermore, the two pressure regulation valves are respectively a pressure regulation valve I and a pressure regulation valve II, and a set pressure value of the pressure regulation valve I is smaller than a set pressure value of the pressure regulation valve II.

Furthermore, the rigid hermetic container is provided with two interfaces thereon, and the two interfaces are connected to the pressure regulation valve I and the pressure regulation valve II through a pneumatic joint I and a pneumatic joint II, respectively.

Furthermore, a set pressure of the pressure regulation valve I is a diastolic pressure, and a set pressure of the pressure regulation valve II is a systolic pressure.

Furthermore, the other end of the pressure regulation valve I is connected to the compressible medium source for introducing a compressible medium into the rigid hermetic container, and the other end of the pressure regulation valve II is connected to the atmosphere.

Furthermore, when the pressure in the rigid hermetic container is less than the set diastolic pressure, the pressure regulation valve I is opened to discharge the compressible medium from the compressible-medium source into the rigid hermetic container; and when the pressure in the rigid hermetic container is greater than the set systolic pressure, the pressure regulation valve II is opened to discharge the compressible medium in the rigid hermetic container, so as to reduce the pressure.

Compared with the prior art, the present invention achieves the following technical effects:

1) in the afterload device for ex situ heart perfusion in the present invention, the hermetic pressure container is externally connected with one pressure reducing valve, one overflow valve and one compressible-medium storage reservoir, so as to control the pressure range in the hermetic container, such that the pressure in the hermetic container is always between the diastolic pressure and the systolic pressure, without causing a situation in which the pressure is too high or too low, which conforms to physiological conditions, does not affect the quality of perfusion, and is more beneficial for measuring and evaluating the parameters of the heart; and 2) in the present invention, the medium pressure in the hermetic pressure container directly squeezes the liquid bag rather than the conduit, and the medium discharged from the pressure control module does not return to the medium storage reservoir, but is directly discharged to the air.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

where, 1 represents a flexible container; 2 represents a rigid hermetic container; 3 represents a compressible medium source; 4 represents an air tube; 5 represents a pressure regulation valve I; 6 represents a pneumatic joint I; 7 represents a pneumatic joint II; 8 represents a pressure regulation valve II; 9 represents a joint I; 10 represents a joint II; 11 represents a snap joint; 12 represents a flow rate regulator one; 13 represents a flow rate regulator two; 14 represents an inlet conduit; and 15 represents an outflow conduit.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide an afterload device for ex situ heart perfusion, to address the aforementioned problems existed in the prior art, which can provide a resistance from which the blood suffers when pumped out, and simulate a normal working mode of the heart in the body.

To make the foregoing objective, features, and advantages of the present invention clearer and more comprehensible, the present invention is further described in detail below with reference to the accompanying drawings and specific embodiments.

Figure 1:
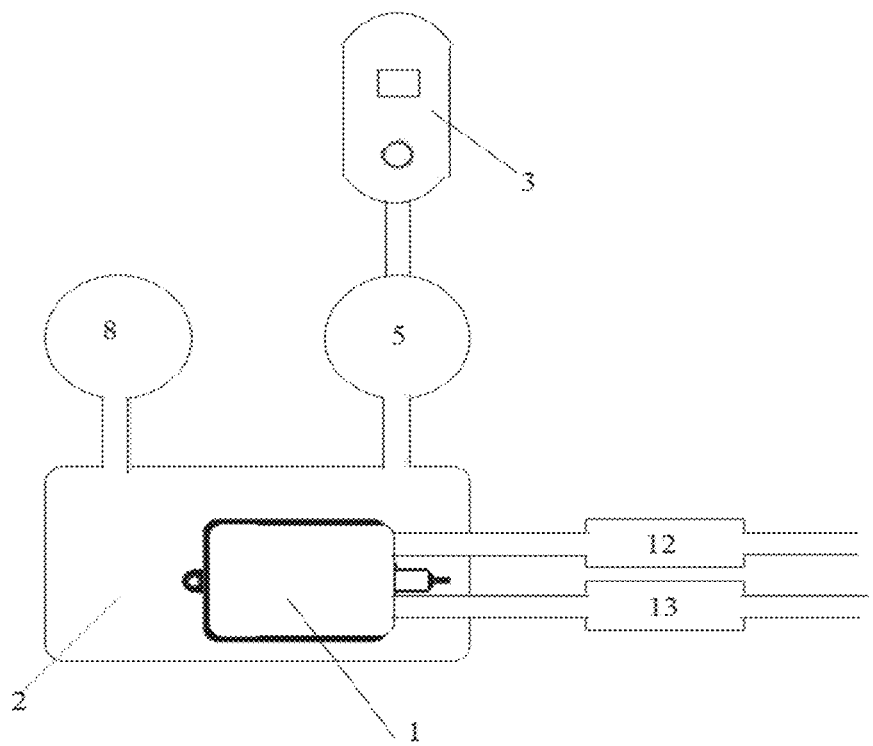
FIG. 1 is a diagram showing the principle of an afterload device.

As shown in FIG. 1, the present invention provides an afterload device for ex situ heart perfusion, which includes two flow rate regulators, a rigid hermetic container 2, a flexible container 1, two pressure regulation valves (a pressure regulation valve I 5 and a pressure regulation valve II 8), and a compressible-medium source 3. In the ex situ heart perfusion system, the perfusion fluid is pumped out from the aortic root and then enters the flexible container 1 through the inlet conduit 14, and after being subjected to the action of medium pressure in the rigid hermetic container 2, the perfusion fluid flows out from the conduit 15 from the other side. The afterload device imparts the perfusion fluid a resistance to simulate the impedance of a cardiovascular system.

Figure 2:
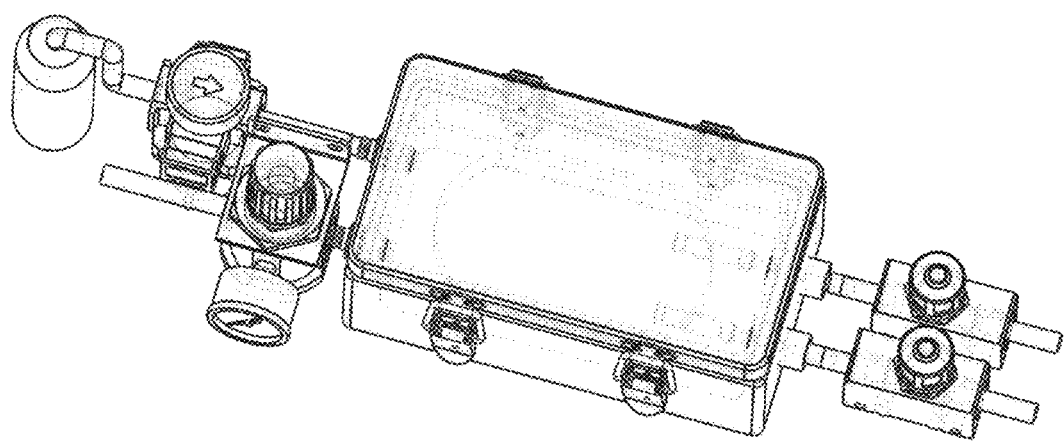
FIG. 2 is a schematic view of the overall structure of the afterload device for an ex situ heart perfusion system.
Figure 3:
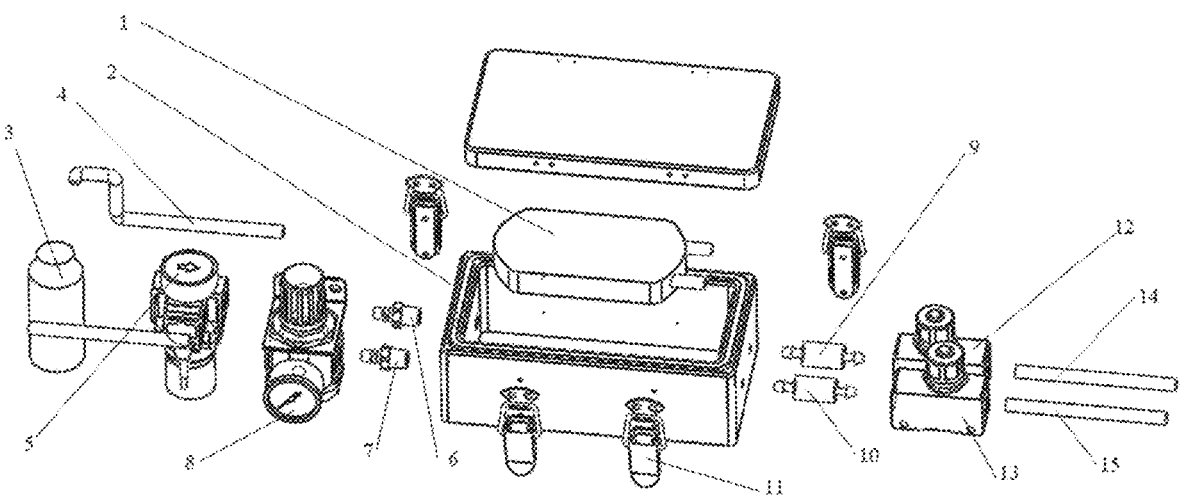
FIG. 3 is an exploded view of the afterload device for the ex situ heart perfusion system.
Figure 4:
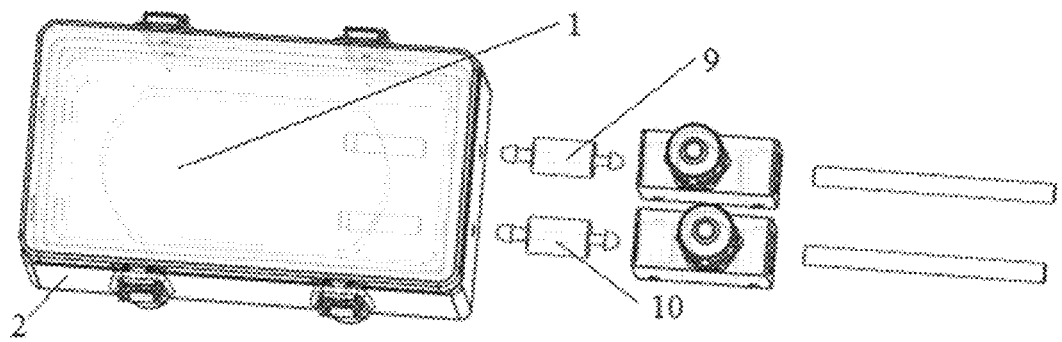
FIG. 4 is an exploded view of the afterload energy storage module.
Figure 5:
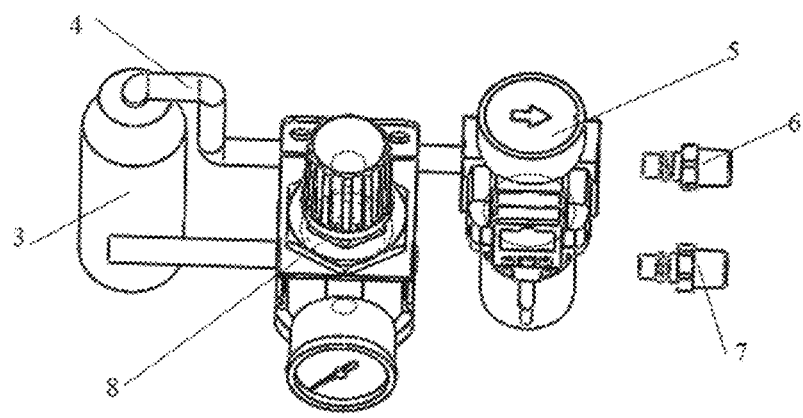
FIG. 5 is a pressure regulation module.

As shown in FIGS. 2, 3 and 4, both a flow rate adjuster one 12 and a flow rate adjuster two 13 are connected by a conduit, and are respectively located at a position before the perfusion fluid enters the flexible container 1 and at a position on the conduit after the perfusion fluid is squeezed out from the flexible container 1, so as to simulate the impedance of the proximal aorta and the total blood vessels. The afterload energy storage module includes a flexible container 1 and a rigid hermetic container 2. The flexible container 1 is placed inside the rigid hermetic container 2 (the flexible container 1 can be fastened inside the rigid hermetic container 2 through a top cover and a snap joint 11 or through other manners). The rigid hermetic container 2 is filled with a compressible medium of a stable pressure. The two interfaces of the flexible container 1 are connected to the rigid hermetic container 2 through a joint I 9 and a joint II 10. The joint I 9 and the joint II 10 are connected with the rigid hermetic container 2 by a threaded connection. That is, the perfusion fluid enters from the inlet conduit 14, through the joint I 9, into the flexible container 1; and when squeezed out, the perfusion fluid passes through the joint II 10, and finally flows out through the outlet conduit 15. The pressure regulation module includes a pressure regulation valve I 5, a pressure regulation valve II 8, and a compressible-medium source 3. The pressure regulation valve I 5 and the pressure regulation valve II 8 are connected with the rigid hermetic container 2 through the inlet conduit 14 and a pneumatic joint I 6 and a pneumatic joint II 7. The pneumatic joint I 6 and the pneumatic joint II 7 are fixed to a side of the rigid hermetic container 2, and are connected to the rigid hermetic container 2 through threaded connection.

In the ex situ heart perfusion system, when pumped out from the aortic root by the heart, the perfusion fluid flows through the inlet conduit 14, through the joint I 9, into the flexible container 2. The medium in the compressible-medium source 3 passes through the air tube 4, through the pressure regulation valve I 5, the pneumatic joint I 6, into the rigid hermetic container 2. A set pressure of the pressure regulation valve I 5 is the diastolic pressure, such that the lowest pressure within the rigid hermetic container 2 is the diastolic pressure. A set pressure of the pressure regulation valve II 8 is the systolic pressure, such that the highest pressure within the rigid hermetic container 2 is the set systolic pressure.

During the systole of the heart, the aortic root pumps out the perfusion fluid, and as the perfusion fluid gradually enters the flexible container 1, the volume in the flexible container 1 becomes larger. At the same time, the pressure inside the rigid hermetic container 2 continues to increase. When the perfusion fluid in a cardiac cycle is completely pumped out from the aortic root and the aortic valve is closed, the pressure in the rigid hermetic container 2 rises to the maximum. If during the increase of the pressure, the magnitude of the pressure would exceed a set systolic pressure, the pressure regulation valve II 8 is opened to discharge the compressible medium into the atmosphere, so as to reduce the pressure and enable the pressure in the rigid hermetic container 2 not greater than the systolic pressure.

During the diastole of the heart, the aortic valve is closed, and after the pumping out of the perfusion fluid is stopped, due to the action of the pressure in the rigid hermetic container 2, a part of the perfusion fluid in the flexible container 1 is squeezed into an interface at a side of the flexible container 1, passes through the joint II 10 and flows out from the outflow conduit 15, and another part of the perfusion fluid is squeezed back into an interface at the inlet side, such that the part of the perfusion fluid enters the coronary artery to provide energy to the heart. During diastole, as the perfusion fluid in the flexible container 1 is gradually squeezed out, the volume of the flexible container 1 gradually decreases, and the pressure in the rigid hermetic container 2 continues to decrease, and when the pressure would be less than the set diastolic pressure, the pressure regulation valve I 5 is opened, and the medium is discharged from the compressible-medium source 5 to increase the pressure, so that the pressure is not less than the set diastolic pressure. The rigid hermetic container 2 is subjected to the action of the pressure regulation valve, such that the pressure in the rigid hermetic container 2 is always between the set diastolic pressure and the set systolic pressure.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

The invention claimed is:

1. An afterload device for ex situ heart perfusion, comprising an energy storage module, a pressure regulation module and two flow rate regulators, wherein the energy storage module comprises a flexible container and a rigid hermetic container filled with compressible media, the flexible container is placed in the inner cavity of the rigid hermetic container and connected to the two flow rate regulators via a conduit; and the pressure regulation module comprises two pressure regulation valves and a compressible-medium source, wherein the two pressure regulation valves are in communication with the rigid hermetic container, wherein the two pressure regulation valves are respectively a pressure regulation valve I and a pressure regulation valve II, and a set pressure value of the pressure regulation valve I is smaller than a set pressure value of the pressure regulation valve II, and the pressure regulation valve I is connected to the compressible-medium source, wherein the rigid hermetic container is provided with two interfaces thereon, and the two interfaces are connected to the pressure regulation valve I and the pressure regulation valve II through a pneumatic joint I and a pneumatic joint II, respectively.

2. The afterload device for ex situ heart perfusion according to claim 1, wherein the flexible container comprises at least has two interfaces, and the two interfaces are respectively sealingly connected to two openings on the rigid hermetic container through a conduit.

3. The afterload device for ex situ heart perfusion according to claim 2, wherein the two flow rate regulators located outside the rigid hermetic container are respectively installed on an inlet conduit and an outflow conduit, and the inlet conduit and the outflow conduit are connected to the two interfaces of the flexible container through a joint I and a joint II, respectively.

4. The afterload device for ex situ heart perfusion according to claim 1, wherein a set pressure of the pressure regulation valve I is a diastolic pressure, and a set pressure of the pressure regulation valve II is a systolic pressure.

5. The afterload device for ex situ heart perfusion according to claim 4, wherein the other end of the pressure regulation valve I is connected to the compressible medium source for introducing a compressible medium into the rigid hermetic container, and the other end of the pressure regulation valve II is connected to the atmosphere.

6. The afterload device for ex situ heart perfusion according to claim 5, wherein when the pressure in the rigid hermetic container is less than the set diastolic pressure, the pressure regulation valve I is opened to discharge the compressible medium from the compressible-medium source into the rigid hermetic container; and when the pressure in the rigid hermetic container is greater than the set systolic pressure, the pressure regulation valve II is opened to discharge the compressible medium in the rigid hermetic container, so as to reduce the pressure.

* * * * *